April 8, 1941.  G. C. MORGAN  2,237,358
LINT CONDENSER
Filed April 29, 1939   2 Sheets-Sheet 2

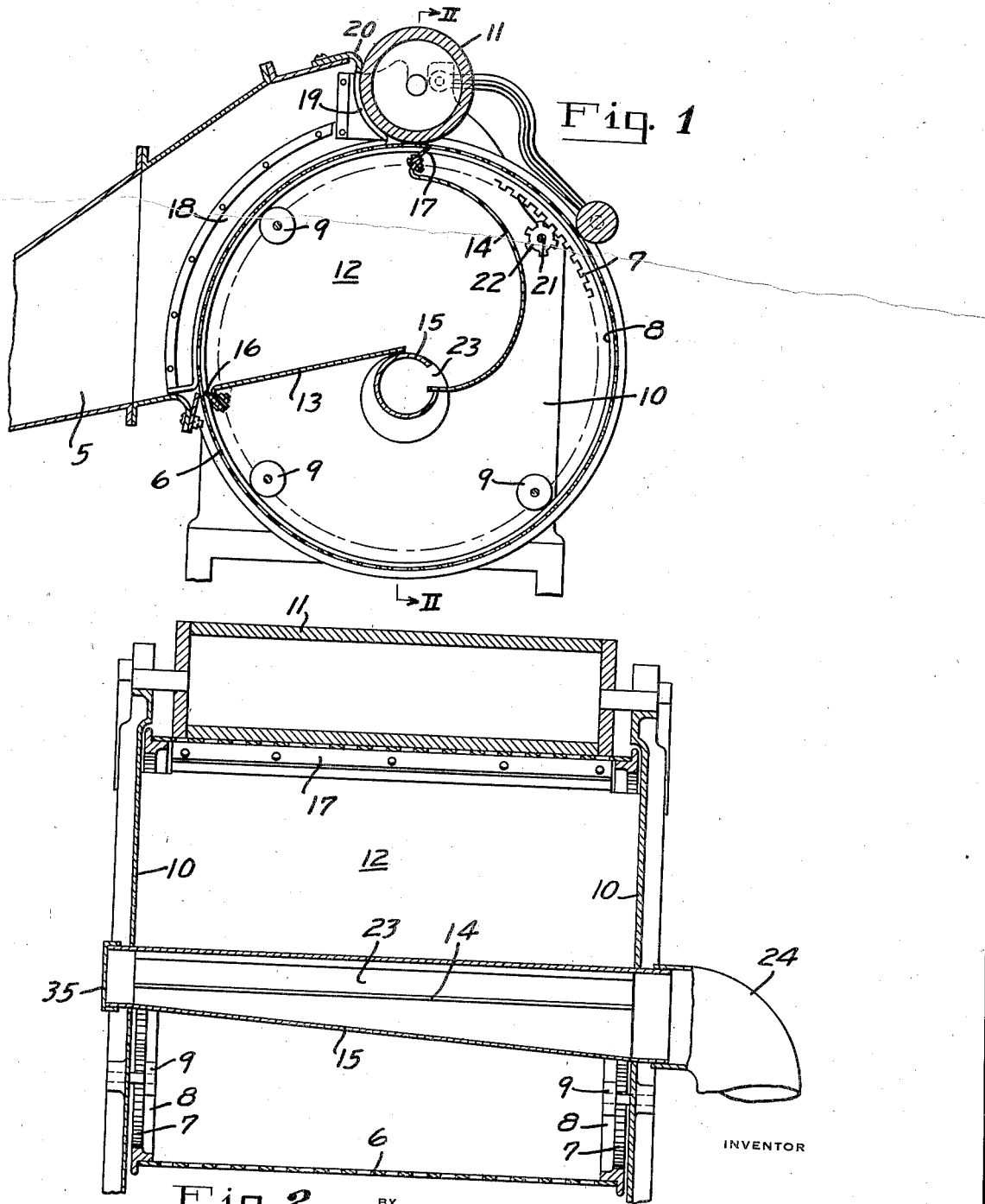

INVENTOR
GEORGE C. MORGAN
BY
*Johnston & Jennings*
ATTORNEYS

Patented Apr. 8, 1941

2,237,358

UNITED STATES PATENT OFFICE 2,237,358

LINT CONDENSER

George C. Morgan, Birmingham, Ala., assignor to Continental Gin Company, a corporation of Delaware Application April 29, 1939, Serial No. 270,759

10 Claims. (Cl. 19—156)

My invention relates to an apparatus for the collection of fibers and the like from an air current.

Typical of such an apparatus is a cotton condenser which passes a moving screen across a duct, through which a lint bearing air current flows, to collect the lint on the screen and carry it off while the air current passes through the screen and out through the duct to any desired treatment apparatus or point of discharge.

It is of particular importance, where the lint and delicate fibers are to be recovered from an air stream, that such stream shall have its lowest pressure and velocity at the moving screen where the separation of the lint occurs and that the air current shall be so withdrawn from the discharge side of said screen as to be free as possible of eddy currents or unbalanced suction that might interfere with the efficient and even collection of lint on the screen and that will enable the outgoing air current to carry out with it any foreign matter as well as any lint that passes with it through the screen.

In my invention I propose to withdraw the air current, stripped of most of its entrained fiber, from the screen into a suction chamber defined by a wall of such curvature or shape that the air currents passing through any portion of the active screen surface will tend to be deflected by such wall toward a common zone or focus within the chamber through which a slotted suction pipe passes.

My invention further contemplates disposing the outlet pipe adjacent to the focus of a parabolic deflector wall with its intake slot lying substantially symmetrical to the plane of the major axis of the parabola.

My invention further comprises defining such a suction chamber opposite the active surface of the screen by a parabolic deflector wall having the suction outlet pipe disposed along, or adjacent to, its focus.

My invention further contemplates forming the suction pipe with its opening so disposed or shielded as to cause the air current to flow indirectly thereinto to reduce the tendency of the air to short circuit directly into a pipe opening that faces the active screen, and insure a better distributed, and lower average velocity, flow of air through the whole active screen surface.

My invention further contemplates arranging the deflector wall either symmetrically or non-symmetrically with respect to the active screen surface it subtends and arranging the suction outlet pipe level with, or above or below the lower edge of said active surface as may be desired.

My invention further comprises the novel details of construction and arrangements of parts which are hereinafter more particularly described and claimed, reference being had to the accompanying drawings, in which:

Fig. 1 is a vertical transverse cross sectional view through a cotton lint condenser equipped with my improved lint collection means.

Fig. 2 is a longitudinal section taken on the line II—II of Fig. 1.

Similar reference numerals refer to similar parts throughout the drawings.

Figure 3:
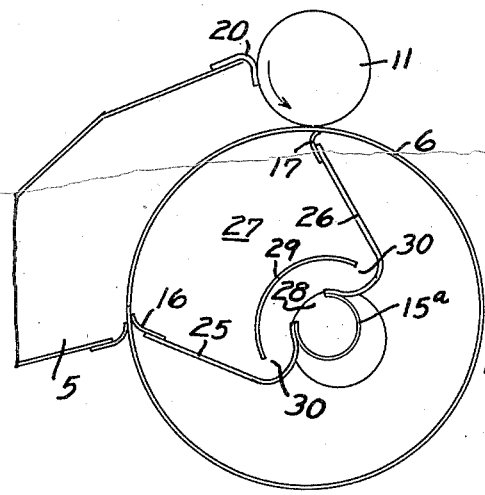
Figs. 3, 4 and 5 are diagrammatic views illustrating modifications on the shape of the suction chamber and in the shape and manner of shielding the intake opening of the suction pipe from direct exposure to the active screen surface.

In the embodiment of my invention illustrated in Figs. 1 and 2, I show a duct 5 for conducting a lint bearing air current from a gin to a rotating cylindrical screen drum 6, the duct being gradually enlarged in its approach to the drum so as to subtend what I term the lint collecting or active portion of the drum screen. The screen is preferably formed by a cylindrical foraminous plate having secured to its ends gear rings 7 and tracks 8 for engagement with the supporting rollers 9 for the drum. These rollers are mounted on the drum heads 10 which provide overhead slots for the reception of the trunnions of a top presser roll 11 which rides on the drum and compresses the bat of cotton that is collected thereon in its traverse of the lint collecting zone. Within the drum I define a suction chamber 12 by means of walls 13 and 14 attached at their ends to the drum heads which close the ends of the chamber. The wall 14 is so curved that it will present surfaces throughout which will tend to deflect the air currents impinging thereon downward toward a common exit. The wall 13 forms a continuation of the bottom of the duct 5 and its inner edge is secured to the top of the suction duct 15. Sealing flaps 16 and 17 extend across the outer ends of the chamber walls and engage the inner surface of the drum screen so as to prevent the escape of air, and sealing flaps 18, 19 and 20 coact with the drum screen and the presser roll 11 to seal the joints between them and the delivery duct 5. A drive shaft 21 is mounted in the drum heads 10 and carries pinions 22 meshing the internal teeth of the gear rings 7 so as to rotate the drum.

The duct 15 is tapered and extends from end to end of the drum, passing through appropriate holes in the drum heads 10 and having an intake slot or opening 23 provided therein coextensive with the width of the suction chamber 12 and faced away from the active surface of the screen and toward the lower end of the wall 14 which approaches the lower edge of the slot radially and is attached thereto so as to deliver the deflected air current radially into the duct 15. The slot is of uniform width with its top and bottom edges horizontal. The large end of the duct 15 is connected to the pipe 24 that delivers into or forms part of a suction system for delivering the air and its entrained lint and dust to any suitable point of discharge or further treatment.

In the operation of the apparatus shown in Figs. 1 and 2, the lint bearing current approaching the condenser drum 6 from the gin will be gradually slowed up by the expanding duct 5 until it reaches the active surface of the drum in the condition best suited for the deposit of the lint thereon. Suction induced by any suitable means in the suction pipe 24 and duct 15 lowers the pressure on the suction chamber 12 so as to withdraw the air current through the drum with a relatively slow motion adjacent to the active surface of the drum and with an accelerated flow as it approaches the opening into the suction duct 15. This accelerated flow is particularly effective to prevent the accumulation of foreign matter in the suction chamber and to cause it all to pass off rapidly with the air current into the suction duct, and since the drum rotates clockwise and presents its clean screen surface adjacent to the wall 13 it tends to induce a rapid flow at the bottom of its active portion, i. e., just above the bottom wall 13 of the suction chamber which will sweep it clean. The slot in the pipe being faced away from the screen avoids any tendency to create disturbing eddy currents that might unbalance the outflow through the active screen surface and adversely affect the deposit of lint on the drum, but the duct opening into the contracted lower end of the chamber 12 will act both to concentrate and to accelerate the air flow thereto and carry out with the current all dirt and foreign matter into suction pipe 24. The air and any foreign matter entrained with it enters radially into the suction duct and the effect of the tapered duct is to produce a suction action that is substantially uniform lengthwise of the drum.

Figure 4:
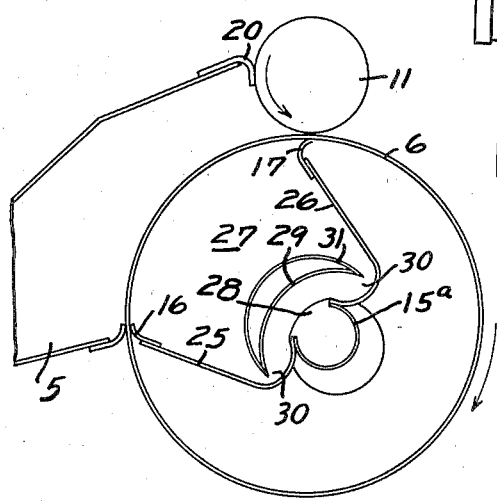
Figure 6:
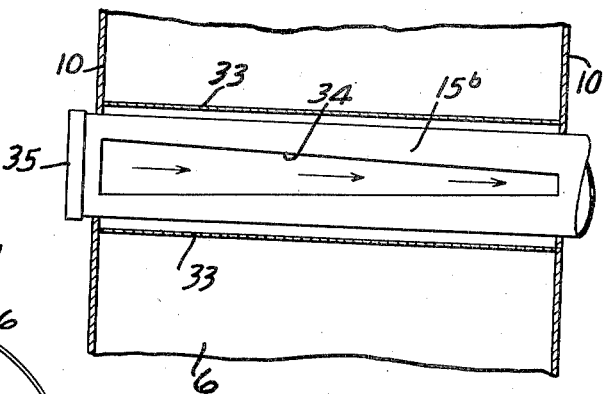
Fig. 6 is a cross sectional view taken on the line VI—VI of Fig. 5.

In Figs. 3 and 4 I show modifications of my invention in which the walls 25 and 26, defining the suction chamber 27, are differently shaped from those shown in Fig. 1, thus the lower wall 25 here defines a descending surface from the bottom of the active surface of the drum screen to the point where the wall curves up to and joins the bottom edge of the slot 28 in the suction duct 15a. The upper wall is similarly shaped and connected to the upper edge of the slot 28. A curved baffle 29 shields the slot and prevents any tendency for the suction to short circuit air directly thereinto, which is undesirable. The suction takes effect over the whole active screen through the reversely curved channels 30 leading downwardly and inwardly from wall surfaces that are inclined so as to deflect all air currents impinging thereon, without eddies in chamber 27, radially into the slot 28. In Fig. 4 the baffle 29 has a guard 31 designed to divide the air with stream-lined effect towards the channels 30. The general operation is the same as hereinabove described except that in this arrangement the foreign matter will flow inwardly and downwardly carried both by the divided current flow and gravity into the intake of the suction duct.

Figure 5:
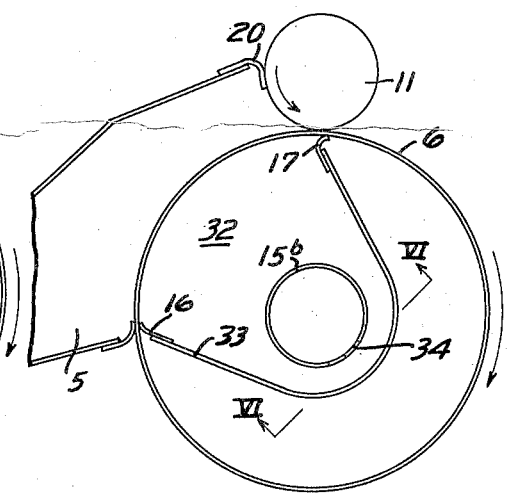

In Fig. 5 I show the suction chamber 32 defined by the single parabolic wall 33 symmetrically arranged with respect of the active surface of the drum it subtends and having the suction duct 15b formed with its longitudinal slot 34, facing the curve and lying in its major axis, the pipe being disposed adjacent to, and parallel with the focus of the wall curve. In this arrangement the air current will flow both over and under the suction pipe and into its slot 34 radially, the suction effect being evenly distributed over the active surface of the screen. In this arrangement the suction duct 15b is uniform in diameter and its slot 34 is gradually contracted towards its connection with the suction pipe. A cap 35 closes the other end of the duct 15b and a similar closure is provided for the ducts 15 and 15a.

The joints between the chamber walls and the screen in all the diagrammatic views are sealed by the flaps 16 and 17, and any suitable means may be used to strip the collected lint from the inactive surface of the drum 6.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. Apparatus for separating fibers from an air stream, comprising a duct for the fiber bearing air stream, a fiber collecting screen movable across the path of said air stream, means to conduct said air stream away from said screen surface comprising walls defining an outlet chamber subtending the active lint collecting surface of the screen, and an air discharge pipe having an intake port communicating with said chamber and extending transversely to the line of flow of the air stream, there being an element disposed to intercept direct radial flow of air from the active surface of the screen into said port, and the chamber walls being disposed to deflect air currents impinging thereon towards said port.

2. An apparatus according to claim 1, in which the discharge pipe is a suction pipe provided with means to equalize the suction action transversely of said screen, and its intake port is faced away from the active screen surface.

3. An apparatus according to claim 1, in which the pipe is provided with a suction connection and means to equalize the suction action transversely of said screen and the intercepting element is formed by a curved wall spaced from the chamber walls and interposed between said intake port and the active screen surface.

4. Apparatus for separating fibers from an air stream, comprising a delivery duct for the fiber bearing air stream, a fiber collecting screen movable across the path of said air stream, means to conduct said air stream away from said screen surface responsive to suction comprising walls defining a suction chamber subtending the active lint collecting surface of the screen, means to seal the joints between both duct and chamber and the interposed screen, and a suction pipe having an intake port communicating with said chamber and extending transversely to the line of movement of the screen, the walls defining said suction chamber being disposed to deflect air currents impinging thereon along opposed paths leading radially into said port, and said port being disposed with an element in position to prevent undeflected access of any substantial portion of the air seeking to flow in a straight path from the active surface of the screen directly into said port.

5. An apparatus according to claim 1, in which the discharge pipe has a suction connection and the chamber walls define a parabola with the suction pipe disposed within the chamber with its intake port opening toward said wall.

6. An apparatus according to claim 1, in which the discharge pipe has a suction connection and the chamber walls define a parabola with the suction pipe disposed symmetrically within the chamber with its intake port opening toward said wall substantially in line with the major axis of the parabola.

7. An apparatus according to claim 1, in which the discharge pipe has a suction connection and the element, interposed between the suction pipe intake port and the active surface of the screen, is a curved baffle within the suction chamber.

8. An apparatus according to claim 1, in which the discharge pipe has a suction connection and the element interposed between the suction pipe intake port and the active surface of the screen is a curved baffle within the suction chamber, the suction chamber walls defining with said baffle reversely curved channels leading above and below the baffle and passing out from said chamber radially into the suction duct.

9. An apparatus according to claim 1, in which the outlet chamber comprises an upwardly inclined bottom wall tangential to the top of the duct and a curved top wall presenting its concave surface to said screen and merging substantially radially into the bottom of the intake port of said pipe which has an end suction connection.

10. An apparatus according to claim 1, in which the outlet chamber comprises an upwardly inclined bottom wall tangential to the top of the duct and a curved top wall merging radially into the bottom of the intake port of the said pipe, said port being faced toward the concave bottom portion of the latter wall and away from direct exposure to the active screen surface and an end suction connection for said pipe.

GEORGE C. MORGAN.